(12) United States Patent
Lundahl et al.

(10) Patent No.: US 11,295,189 B2
(45) Date of Patent: Apr. 5, 2022

(54) SMARTCARD COMPRISING A FINGERPRINT SENSOR AND METHOD FOR MANUFACTURING THE SMARTCARD

(71) Applicant: FingerPrint Cards AB, Gothenburg (SE)

(72) Inventors: Karl Lundahl, Gothenburg (SE); Olivier Lignier, Préverenges (CH)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 15/733,899

(22) PCT Filed: May 27, 2019

(86) PCT No.: PCT/SE2019/050486
§ 371 (c)(1),
(2) Date: Dec. 1, 2020

(87) PCT Pub. No.: WO2019/235989
PCT Pub. Date: Dec. 12, 2019

(65) Prior Publication Data
US 2021/0224626 A1     Jul. 22, 2021

(30) Foreign Application Priority Data
Jun. 7, 2018   (SE) .................................. 1850690-7

(51) Int. Cl.
*G06K 5/00*     (2006.01)
*G06K 19/07*    (2006.01)
*G06K 19/077*   (2006.01)

(52) U.S. Cl.
CPC ............ *G06K 19/0718* (2013.01); *G06K 19/07722* (2013.01)

(58) Field of Classification Search
CPC ............ G06N 20/10; G06N 3/08; G06N 5/04; G06Q 20/405; H04L 2209/56
(Continued)

(56) References Cited

U.S. PATENT DOCUMENTS

| 7,607,583 B2 * | 10/2009 | Berardi | G06K 7/0008 |
| | | | 235/380 |
| 7,841,539 B2 * | 11/2010 | Hewton | G06Q 20/40145 |
| | | | 235/492 |

(Continued)

FOREIGN PATENT DOCUMENTS

| CN | 102782700 A | 11/2012 |
| CN | 104182739 A | 12/2014 |

(Continued)

OTHER PUBLICATIONS

PCT International Search Report and Written Opinion for International Application No. PCT/SE2019/050486 dated Aug. 26, 2019, 10 pages.

(Continued)

*Primary Examiner* — Daniel St Cyr
(74) *Attorney, Agent, or Firm* — RMCK Law Group, PLC

(57) ABSTRACT

Method for manufacturing a smartcard comprising a fingerprint sensor, the method comprising: arranging a fingerprint sensor module in an opening of a carrier layer of a smartcard body; forming a cavity in the smartcard in an area corresponding to a sensing area of the fingerprint sensor module; forming a plurality of surface structures in the cavity of the smartcard; depositing a liquid hydrophobic material in the cavity to at least partially cover the surface structures and a smartcard manufactured according to the described method.

15 Claims, 5 Drawing Sheets

(58) Field of Classification Search
USPC .............................. 235/380, 382, 492, 487
See application file for complete search history.

(56) References Cited

U.S. PATENT DOCUMENTS

| | | | |
|---|---|---|---|
| 8,276,816 B2 | 10/2012 | Gardner | |
| 2003/0209362 A1 | 11/2003 | Kasuga et al. | |
| 2008/0105751 A1* | 5/2008 | Landau | G06Q 20/341 |
| | | | 235/492 |
| 2008/0282540 A1 | 11/2008 | Singleton | |
| 2008/0308627 A1* | 12/2008 | Sines | G06K 19/06187 |
| | | | 235/380 |
| 2012/0049309 A1* | 3/2012 | Kiyomoto | G06K 19/0718 |
| | | | 257/434 |
| 2012/0085822 A1* | 4/2012 | Setlak | G06K 9/605 |
| | | | 235/439 |
| 2013/0207786 A1* | 8/2013 | Hutzler | G06K 19/0718 |
| | | | 340/10.51 |
| 2016/0125220 A1 | 5/2016 | Lundahl | |
| 2016/0140379 A1 | 5/2016 | Pedersen | |
| 2018/0039874 A1* | 2/2018 | Fischer | G06K 19/077 |

FOREIGN PATENT DOCUMENTS

| | | | |
|---|---|---|---|
| EP | 3019998 A1 | 5/2016 | |
| GB | 2508039 A | 5/2014 | |
| GB | 2548638 A | 9/2017 | |
| GB | 2548639 A | 9/2017 | |
| WO | 2005058004 A2 | 6/2005 | |
| WO | 2009155501 A2 | 12/2009 | |
| WO | 2009155501 A3 | 3/2010 | |
| WO | 2011080262 A1 | 7/2011 | |
| WO | 2015005851 A1 | 1/2015 | |

OTHER PUBLICATIONS

Extended European Search Report dated Jun. 10, 2021 for EP Application No. 19815858.6, 6 pages.

* cited by examiner

SMARTCARD COMPRISING A FINGERPRINT SENSOR AND METHOD FOR MANUFACTURING THE SMARTCARD

CROSS-REFERENCE TO RELATED APPLICATIONS

This application is a 371 U.S. National Stage of International Application No. PCT/SE2019/050486, filed May 27, 2019, which claims priority to Swedish Patent Application No. 1850690-7 filed Jun. 7, 2018. The disclosures of each of the above applications are incorporated herein by reference in their entirety.

FIELD OF THE INVENTION

The present invention relates to a smartcard comprising a biometric sensor and to a method for manufacturing a smartcard comprising a biometric sensor.

BACKGROUND OF THE INVENTION

As the development of biometric devices for identity verification, and in particular of fingerprint sensing devices, has led to devices which are made smaller, cheaper and more energy efficient, the possible applications for such devices are increasing.

In particular fingerprint sensing has been adopted more and more in, for example, consumer electronic devices, due to small form factor, relatively beneficial cost/performance factor and high user acceptance.

Capacitive fingerprint sensing devices, built based on CMOS technology for providing the fingerprint sensing elements and auxiliary logic circuitry, are increasingly popular as such sensing devices can be made both small and energy efficient while being able to identify a fingerprint with high accuracy. Thereby, capacitive fingerprint sensors are advantageously used for consumer electronics, such as portable computers, tablets and mobile phones. There is also an increasing interest in using fingerprint sensors in smartcards to enable biometric identification in a card such as a bank card where other types of biometric systems are not applicable.

However, capacitive fingerprint sensing devices are typically sensitive to contaminants located between the capacitive sensing elements of the sensor and the finger to be measured. Contaminants may be introduced from the ambient, such as e.g. moisture from the air, or from the surface of a person's fingertip (such as e.g sweat, hand lotion etc). For example, residual fingerprints on the sensing surface may reduce the accuracy of the sensing device, and may in worst case lead to erroneous readings. Contaminants on the sensing surface located such that they span across boundaries between sensing elements may for example lead to a coupling between adjacent sensing elements, which in turn reduces the accuracy of the sensing device. Moreover, smartcards of the credit card type are often stored in a wallets, pocket etc. where they may be exposed to different types of contaminants.

Accordingly, it is desirable to reduce the occurrence of contaminants on the sensing surface of a capacitive fingerprint sensing device in a smartcard.

SUMMARY

In view of above-mentioned and other drawbacks of the prior art, it is an object of the present invention to provide an improved smartcard and method for manufacturing a smartcard comprising a fingerprint sensor module which is less sensitive to contaminants on the sensor surface.

According to a first aspect of the invention, there is provided a method for manufacturing a smartcard comprising a fingerprint sensor module. The method comprising: arranging a fingerprint sensor module in a smartcard; forming a cavity in the smartcard in an area corresponding to a sensing area of the fingerprint sensor module; forming a plurality of surface structures in the cavity of the smartcard; depositing a hydrophobic material in the cavity to at least partially cover the surface structures.

The fingerprint sensor module may advantageously comprise a capacitive fingerprint sensor comprising an array of electrically conductive sensing elements. A capacitive fingerprint sensor should be understood to further comprise sensing circuitry connected to sensing elements for reading a signal from the sensing elements. The sensing circuitry may in turn comprise or be connected to readout circuitry for providing a result of the sensing device to an external device for further processing, which in the present case is circuitry in the smartcard. It should however be noted that various embodiments of the described invention equally well may be applied for other types of fingerprint sensors, such as optical or ultrasonic fingerprint sensors.

The smartcard can be considered to be formed as a laminate structure comprising a plurality of layers, such as a carrier layer and outer layers on respective sides of the carrier layer. Typically, the smartcard will also comprise one or more electrically conductive layers embedded in the card to route signals between different parts of the card.

A hydrophobic material exhibiting hydrophobic surface properties should in the present context be understood as a material which in general repels water.

The present invention is based on the realization that by means of the claimed method, a cavity providing a number of advantages may be formed in a smartcard in a simple and efficient manner. In particular, by forming the cavity first and subsequently depositing the hydrophobic material, the extension of the hydrophobic material is limited by the cavity, meaning that there is no specific requirement for a mask to define where the hydrophobic material is provided. It is sufficient to control the amount of material deposited, and to control to deposition location with sufficient accuracy so that the material ends up in the cavity. Accordingly, the claimed manufacturing method can be performed with fewer method steps and with lower requirements on precision compared to if a coating was to be applied on a planar surface.

Furthermore, the described cavity provides a number of advantages for the smartcard as a whole. One advantage is that the cavity leads to improved sensitivity of the fingerprint sensor since the distance between a finger placed in the cavity of the sensing elements is reduced compared to if no cavity would be present. The cavity may also be referred to as a recess, indentation or the like. It is furthermore assumed that the fingerprint sensor is placed as close as possible to the outer surface of the smartcard.

Moreover, the cavity provides tactile feedback to a user touching the smartcard surface. Thereby, a user will not have to look at the smartcard to find the location of the fingerprint sensor, which improves the usability of the described smartcard.

A further advantage of the described cavity is that the surface is less sensitive to contamination since contaminants are less likely to adhere to the hydrophobic material. Furthermore, the described cavity is also able to maintain hydrophobic properties also after significant wear and tear due to the surface structures formed in the cavity. In particular, as the hydrophobic layer of the sensing cavity is worn away, the hydrophobic material will remain between the surface structures where it is protected from wear and tear, for example from a finger being swept over the cavity. Thereby, the hydrophobic material remaining between the surface structures will prevent the formation of a continuous film of contaminants, such as drops of sweat, across a larger area of the cavity. Instead, contaminants located on the surface will be broken up into smaller portions by means of the portions of hydrophobic material between the surface structures, thereby reducing the risk that a continuous film is formed across the boundary between adjacent sensing elements, which in turn, reduces the occurrence of coupling between adjacent sensing elements According to one embodiment of the invention, the smartcard body may comprises a thermoplastic material and wherein the cavity is formed using a thermal pressing tool comprising a pressing plate in turn comprising a surface structure configured to form the cavity and the surface structures. The surface structure of the pressing plate may comprise a protruding portion for forming the cavity, and a plurality of recesses for forming the surface structures of the cavity.

According to one embodiment of the invention, the surface structures are formed in the same step as the formation of the cavity. Thereby, no additional method steps are required for forming the described surface structures. Moreover, the step may also comprise lamination of the smartcard as a whole, meaning that formation of the cavity and of the surface structures can be performed in a manufacturing step which anyway must be performed when manufacturing the smart card. The only modification required is a modification of the shape of the thermal pressing tool.

According to one embodiment of the invention, depositing the hydrophobic material may advantageously comprise dispensing a liquid hydrophobic material in the cavity and curing the hydrophobic material. Thereby, the liquid material will flow out and form a layer having a homogeneous thickness in the cavity, with the area covered by the liquid being limited by the cavity sidewalls, without the need for any additional method steps.

According to one embodiment of the invention, depositing the hydrophobic material may comprise spray coating the liquid hydrophobic material in the cavity and curing the hydrophobic material. Spray coating, in particular ultrasonic spraying can be used to deposit thin layers of coating, which may be required for some materials that may otherwise crack if they are deposited in too thick layers. Spray coating can be performed both with and without the use of a mask.

According to one embodiment of the invention, depositing a hydrophobic material in the cavity may comprise fully covering the surface structures. Thereby, the cavity will exhibit a planar surface when new. Only when the hydrophobic layer has been worn away will the surface structures be exposed.

According to one embodiment of the invention, the surface structures may have a maximum cross section size in the plane of the smart card surface in the range of 5-100 µm. The size and density of the surface structures can be decided based on which effects it is desirable to achieve. The surface structures may for example be a configured to form a visible pattern. Moreover, it may be desirable to configure the surface structure so that a user feels the structures when touching the cavity, thereby improving the tactile feedback in the cavity.

According to one embodiment of the invention, the surface structures may have a height in the range of 5-50 µm. The height of the surface structures is preferably selected based on the depth of the cavity and the thickness of the hydrophobic layer.

According to one embodiment of the invention the hydrophobic material may be a fluorinated carbon polymer. The hydrophobic material may for example be achieved by incorporating fluorine functional groups on a polymer or ceramic backbone structure or by utilizing a polymer which intrinsically contains fluorine in the main polymer chain, such as e.g. Polytetrafluoroethylene (PTFE). The hydrophobic material may also have oleophobic properties.

According to one embodiment of the invention, the smartcard comprises a plurality of layers arranged on a first side of the carrier layer to cover the sensing surface of the fingerprint sensor module; a plurality of layers arranged on a second side of the carrier layer, opposite the first side of the carrier layer, to cover the backside of the fingerprint sensor module; wherein cavity is formed in the outermost layer of the plurality of layers covering the sensing surface of the fingerprint sensor module. Thereby, it is only required that the outermost layer is adapted for forming the cavity and surface structure. However, it is also possible that the cavity has a depth exceeding the thickness of the outermost layer so that the cavity is formed in a plurality of layers.

According to a second aspect of the invention, there is provided a smartcard comprising: a carrier layer comprising a fingerprint sensor module arranged in an opening of the carrier layer, the fingerprint sensor module having a front side comprising a sensing surface and a backside opposite the front side; a plurality of layers arranged on a first side of the carrier layer to cover the sensing surface of the fingerprint sensor module; a plurality of layers arranged on a second side of the carrier layer, opposite the first side of the carrier layer, to cover the backside of the fingerprint sensor module; wherein the outermost layer of the plurality of layers covering the sensing surface of the fingerprint sensor module comprises a cavity in an area corresponding to the sensing surface of the fingerprint sensor module, the cavity comprising a plurality of surface structures and a hydrophobic material located in the cavity and at least partially covering the surface structures.

Effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the system and method according to the present invention are mainly described with reference to a smartcard comprising a capacitive fingerprint sensor embedded therein. However, the described method may also be employed for other types of biometric devices suitable for use in a smartcard.

Figure 1:
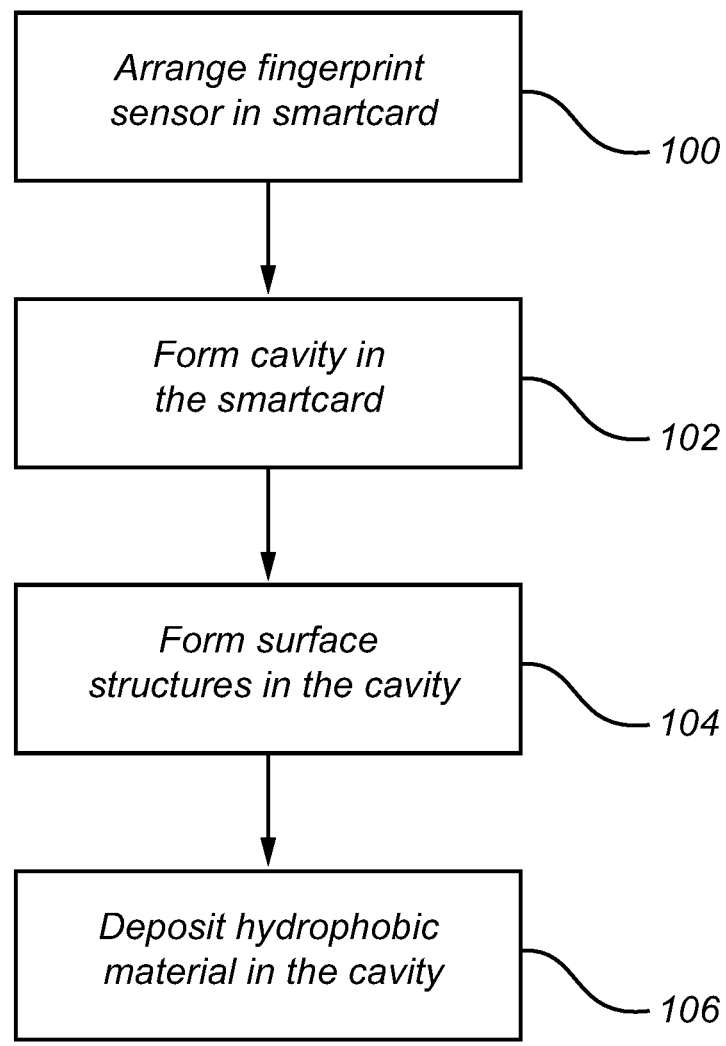
FIG. 1 is a flow chart outlining the general steps of a method according to an embodiment of the invention.

FIG. 1 is a flow chart outlining the general steps of a method according to an embodiment of the invention. The method will be described with further reference to FIGS. 2A-2D schematically illustrating general method steps of a method of manufacturing a smart card according to an embodiment of the invention.

First, a smartcard body 200 comprising an opening 202 for receiving a fingerprint sensor module 204 is provided. A smartcard is typically a laminated structure comprising a plurality of layers where many variations are possible. In the present description, only the layers most relevant for the described method will be illustrated and discussed to avoid cluttering the drawings. It can however be assumed that the smartcard comprises one or more conductive layers (not shown) for connecting the fingerprint sensor module to other circuitry of the smartcard.

Figure 2A:
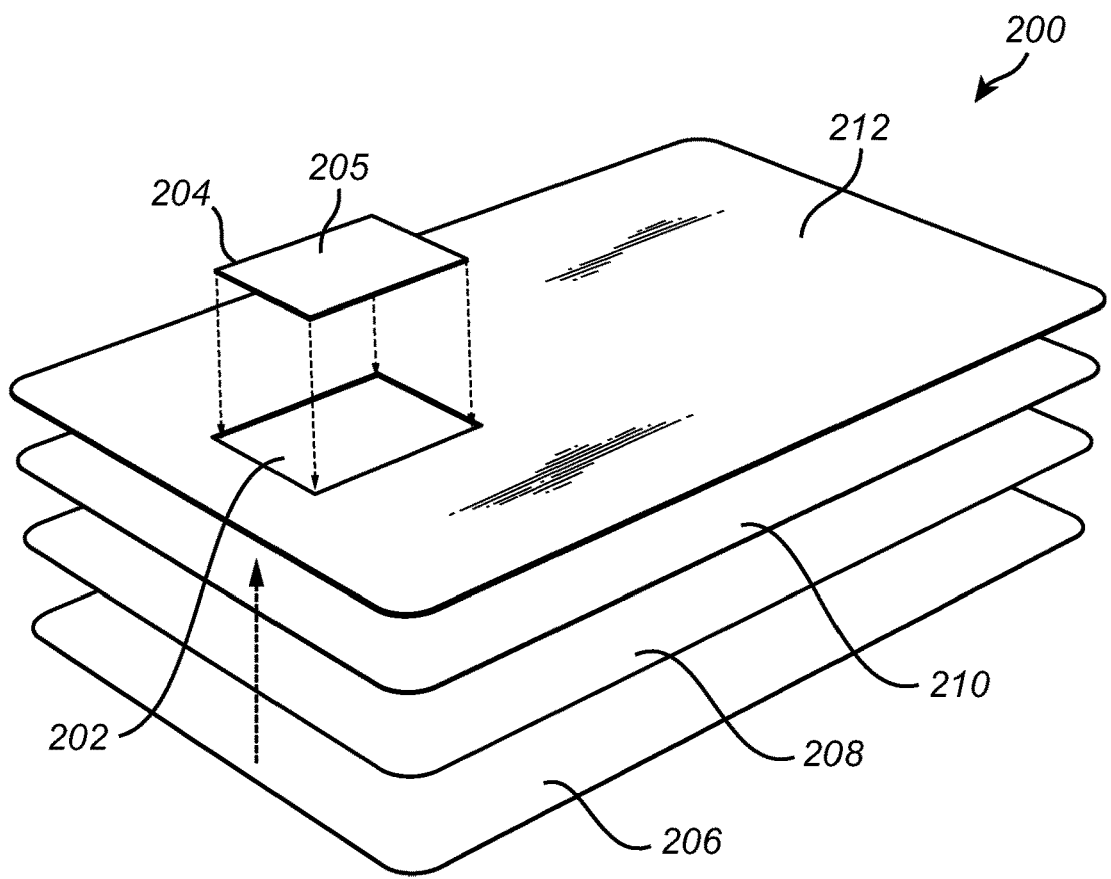
FIGS. 2A-2D schematically illustrate a method of manufacturing a smartcard according to an embodiment of the invention.

The smartcard body 200 illustrated in FIG. 2A comprises, from the bottom and up, a transparent overlay layer 206, a print layer 208, a cover layer 210 and a carrier layer 212. The carrier layer 212 may also be referred to as an interposer layer. The opening 202 formed to receive the fingerprint sensor module 204 is in the illustrated example formed in the carrier layer 212.

Figure 2B:
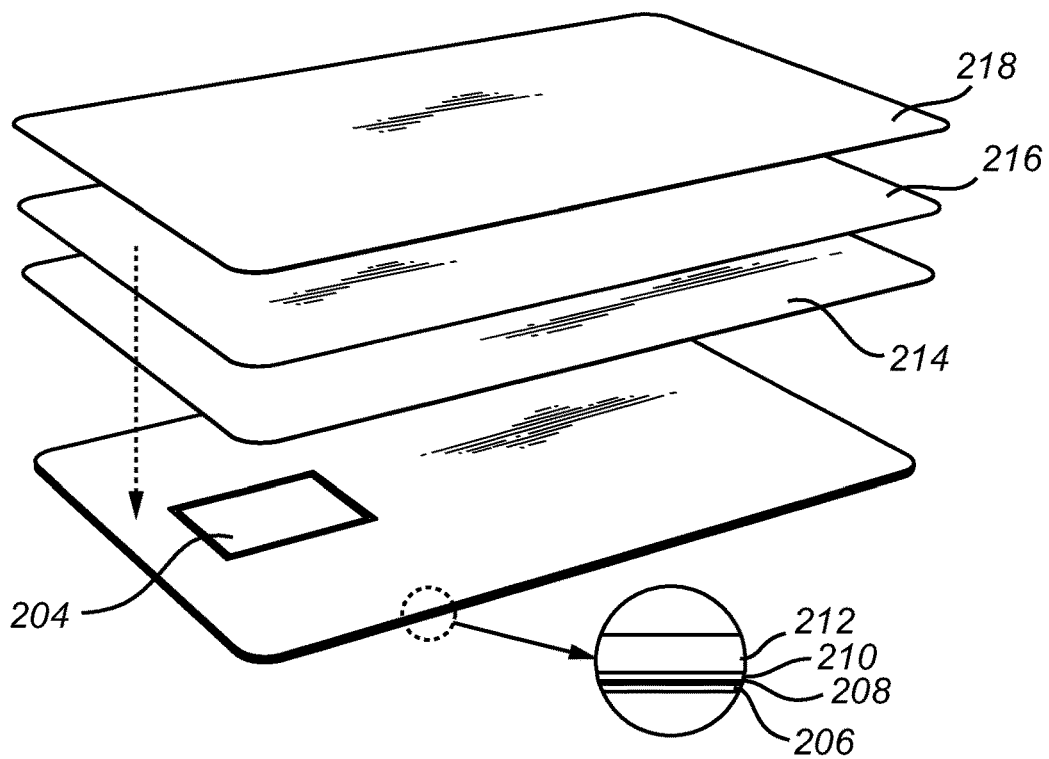

In a first step, the fingerprint sensor module 204 is arranged 100 in the opening 202 of the smartcard 200 as illustrated in FIG. 2A. The fingerprint sensor module 204 may comprise active or passive circuitry required for readout and/or for communication with external circuitry. The front side 205 of the fingerprint sensor module 204 comprising a sensing surface is facing upwards in FIG. 2A, and the backside 207 is thus facing the floor of the opening 202. The opening 202 may be an opening 202 reaching through the carrier layer 212, or it may be a recess in the carrier layer 212. Arranging the fingerprint sensor module 204 in the smart card body further comprises arranging a second cover layer 214, a second print layer 216, and a second transparent overlay layer 218 covering the fingerprint sensor module 204 as illustrated in FIG. 2B, to form what will be the top side 220 of the finalized smartcard.

Figure 2C:
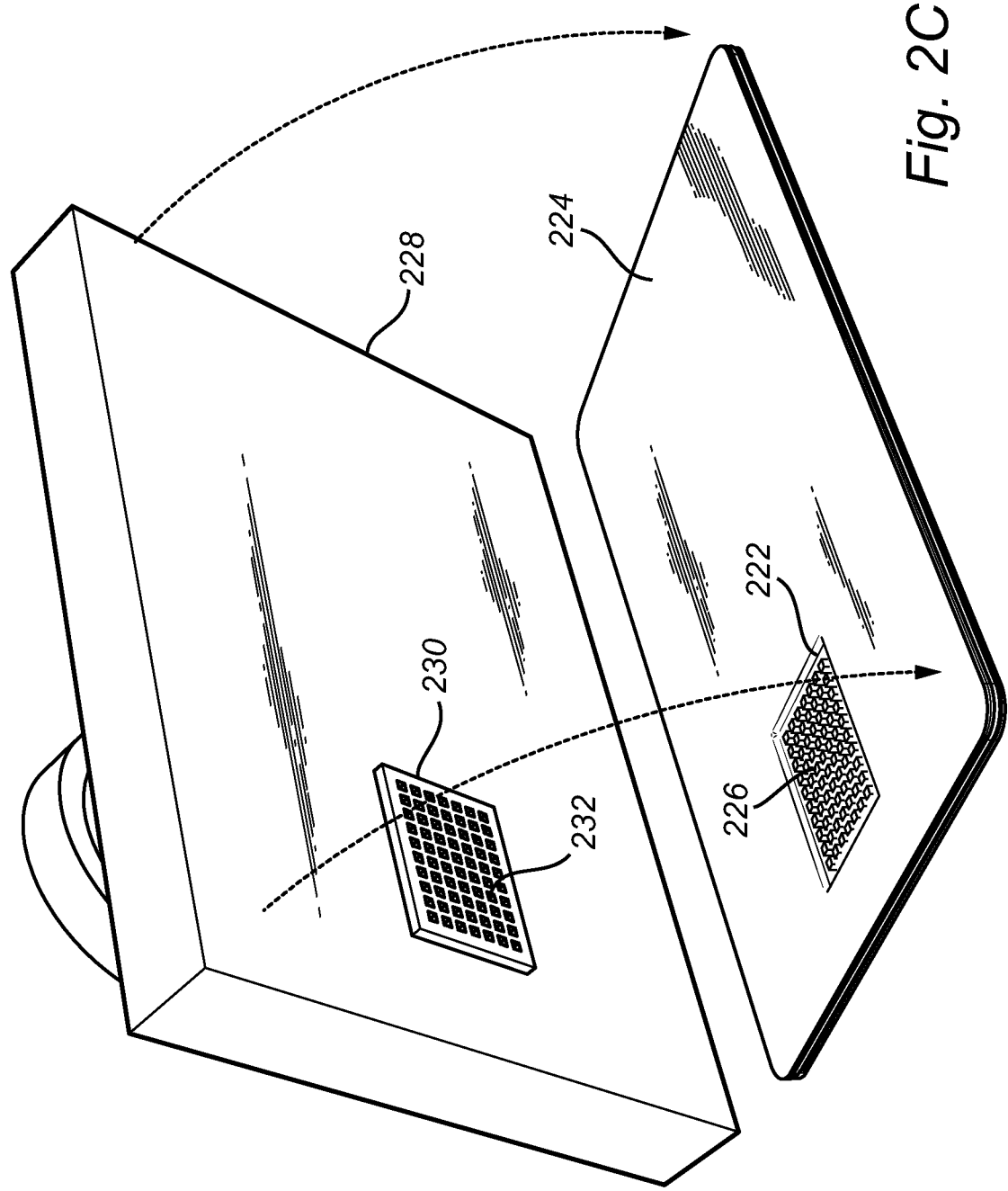

Next, FIG. 2C illustrates forming 102 a cavity 222 in the laminated smartcard body 224 in an area corresponding to the location of the fingerprint sensor module 204, and in particular at the location of the sensing area of the fingerprint sensor module 204. In FIG. 2C a plurality of surface structures 226 are formed 104 in the cavity 222 of the smartcard in the same step as the cavity 222 is formed. The sensor module 204 may be larger than the active sensing area of a fingerprint sensor chip of the sensor module 204, and the cavity 222 may be formed to only cover the active sensing area of the sensor module 204.

In the present example, the lamination of the different layers of the smartcard, the formation of the cavity and the formation of the surface structures is performed in one and the same process step using a thermal pressing tool 228. The outermost layer of the laminated smartcard body 224, here the second overlay layer 218 is made from a thermoplastic material which deforms when subjected to heat and pressure from the thermal pressing tool 228. Examples of thermoplastic materials used for the purpose of producing smart cards include polyvinyl chloride (PVC) and polycarbonate (PC).

The thermal pressing tool 228, which may also be referred to as a molding tool comprises a protruding portion 230 used to form the cavity 222 and also recessed portions 232 which are transferred (mirrored) to the card during the lamination process to form the surface structures 226. Accordingly, the thermal pressing tool 228 applies pressure and heat to the stack of layers to form the cavity 222 and the surface structures 226 in the same step as the lamination of the smartcard. For a PVC material, the required temperature for forming the cavity 222 and surface structures 226 is in the range of 140-160° C.

The depth of the cavity 222 is preferably in the range of 10-50 µm and the height of the surface structures 226 may be in the same range, i.e. 10-50 µm. Moreover, the surface structures 226 may for example be formed as cuboids, pyramids or truncated pyramids, while other shapes are also possible.

Figure 2D:
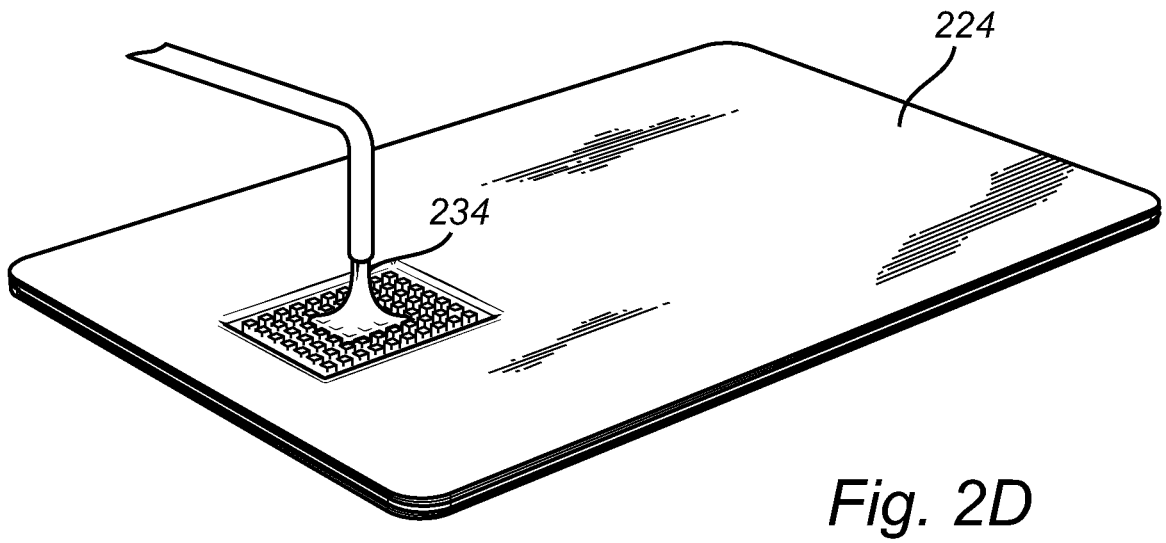
Figure 3A:
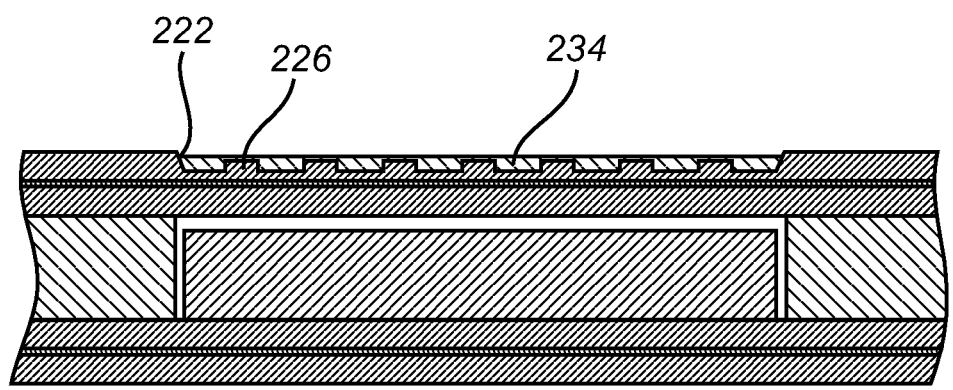
FIGS. 3A-3B schematically illustrate features of a smartcard according to an embodiment of the invention.

The next step, illustrated in FIG. 2D, comprises depositing 106 a liquid hydrophobic material 234 in the cavity 222 to at least partially cover the surface structures 226. The liquid hydrophobic material 234 is here illustrated as being dispensed in the cavity 222, where it flows out to form a homogeneous surface as illustrated in FIG. 3A where a plurality of rectangular surface structures 226 are covered by the hydrophobic material 234.

Figure 3B:
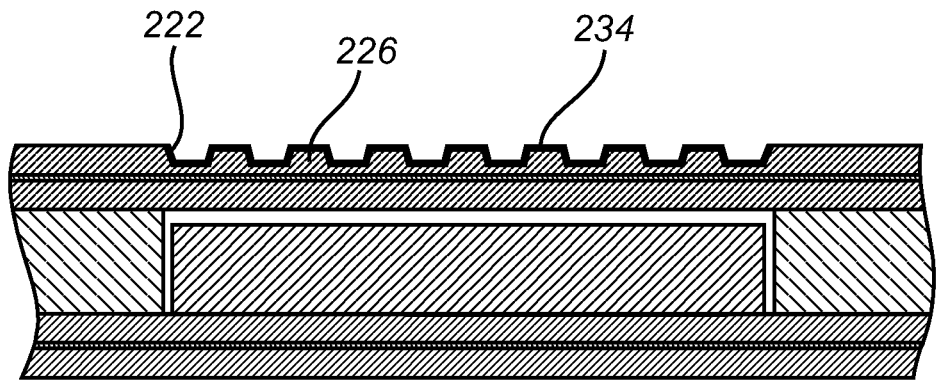

FIG. 3B illustrates an example embodiment where surface structures having the shape of truncated pyramids are covered by a thin layer of hydrophobic material 234. The thickness of the hydrophobic material 234 layer may be in the range of 3-10 µm. Such a thin layer covering only the surfaces of the surface structures 226 and the cavity floor can be achieved by spray coating.

The hydrophobic material 234 may for example be a fluorinated carbon polymer such as PTFE (Polytetrafluoroethylene).

Figure 4:
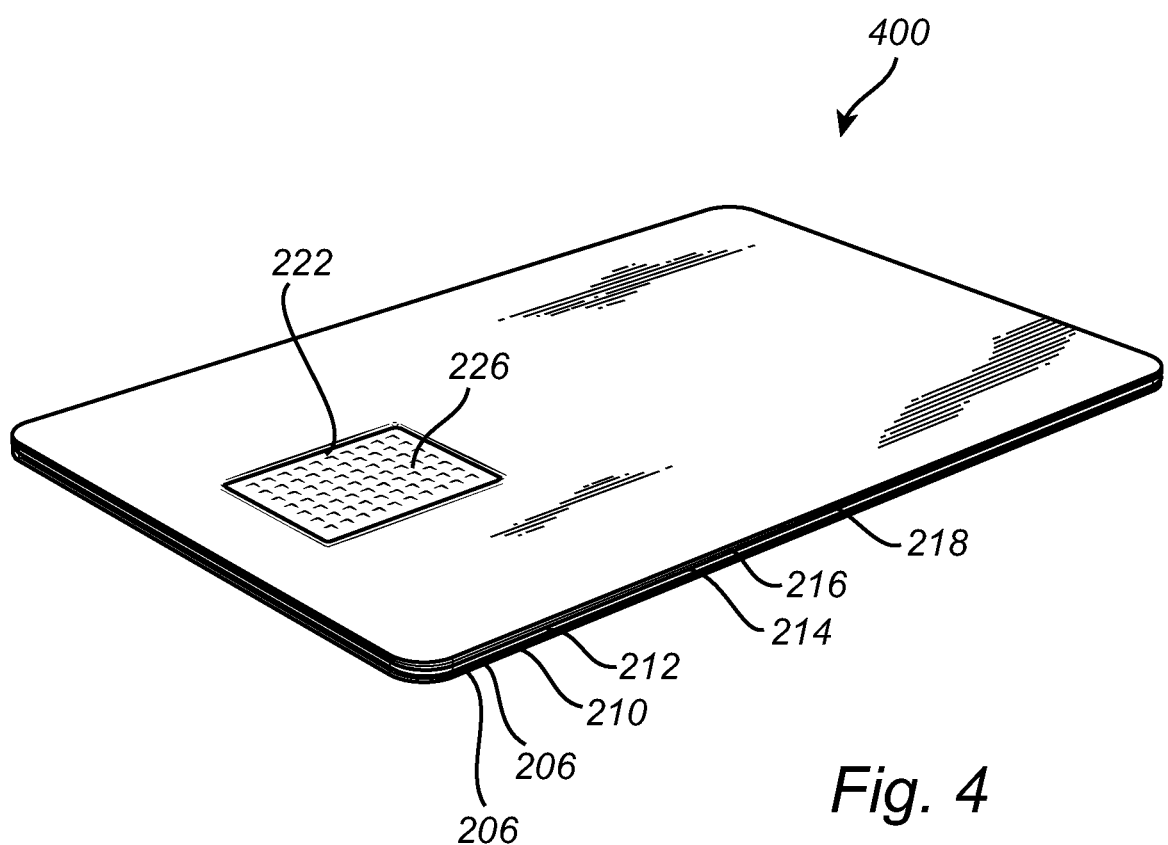
FIG. 4 is a smartcard according to an embodiment of the invention.

FIG. 4 schematically illustrates a complete smartcard 400 according to an embodiment of the invention. The smartcard 400 comprises a carrier layer 212 comprising a fingerprint sensor module 204 arranged in an opening 202 of the carrier layer 212, a plurality of layers arranged 214, 216, 218 on a first side of the carrier layer 212 to cover the sensing surface of the fingerprint sensor module and a plurality of layers 206, 208, 210 arranged on a second side of the carrier layer 212, opposite the first side of the carrier layer 212, to cover the backside of the fingerprint sensor module. The outermost layer 218 of the plurality of layers 214, 216, 218 covering the sensing surface of the fingerprint sensor module 204 comprises a cavity 222 in an area corresponding to the sensing surface of the fingerprint sensor module 204, the cavity 222 comprising a plurality of surface structures 226 and a hydrophobic material 234 located in the cavity and at least partially covering the surface structures 226.

It should be noted that the cavity may be formed in many different ways and have different shapes, but that it should always provide the tactile feedback required for a user to discover the location of the fingerprint sensor by touch only.

Even though the invention has been described with reference to specific exemplifying embodiments thereof, many different alterations, modifications and the like will become apparent for those skilled in the art. Also, it should be noted that parts of the method may be omitted, interchanged or arranged in various ways, the method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. Method for manufacturing a smartcard comprising a fingerprint sensor, the method comprising:
   arranging a fingerprint sensor module in an opening of a carrier layer of a smartcard body;
   arranging a plurality of layers on a first side of the carrier layer to cover the sensing surface of the fingerprint sensor module;
   forming a cavity in the smartcard in an area corresponding to a sensing area of the fingerprint sensor module, wherein the cavity is formed in the outermost layer of the plurality of layers covering the sensing surface of the fingerprint sensor module;
   forming a plurality of surface structures in the cavity of the smartcard; and
   depositing a liquid hydrophobic material in the cavity to at least partially cover the surface structures.

2. The method according to claim 1, wherein the smartcard comprises a thermoplastic material and wherein the cavity is formed using a thermal pressing tool comprising a pressing plate comprising a surface structure configured to form the cavity and the surface structures.

3. The method according to claim 2, wherein the surface structures are formed in the same step as the formation of the cavity.

4. The method according to claim 1, wherein depositing the hydrophobic material comprises dispensing a liquid hydrophobic material in the cavity and curing the hydrophobic material.

5. The method according to claim 1, wherein depositing the hydrophobic material comprises spray coating the liquid hydrophobic material in the cavity and curing the hydrophobic material.

6. The method according to claim 1, wherein depositing a hydrophobic material in the cavity comprises fully covering the surface structures.

7. The method according to claim 1, wherein the surface structures have a maximum cross section size in the plane of the smart card surface in the range of 5-100 µm.

8. The method according to claim 1, wherein the surface structures have a height in the range of 5-50 µm.

9. The method according to claim 1, wherein the hydrophobic material is a fluorinated carbon polymer.

10. The method according to claim 1, wherein the smartcard comprises a plurality of layers arranged on a second side of the carrier layer, opposite the first side of the carrier layer, to cover the backside of the fingerprint sensor module.

11. A smartcard comprising:
    a carrier layer comprising a fingerprint sensor module arranged in an opening of the carrier layer, the fingerprint sensor module having a front side comprising a sensing surface and a backside opposite the front side;
    a plurality of layers arranged on a first side of the carrier layer to cover the sensing surface of the fingerprint sensor module;
    a plurality of layers arranged on a second side of the carrier layer, opposite the first side of the carrier layer, to cover the backside of the fingerprint sensor module;
    wherein the outermost layer of the plurality of layers covering the sensing surface of the fingerprint sensor module comprises a cavity in an area corresponding to the sensing surface of the fingerprint sensor module, the cavity comprising a plurality of surface structures and a hydrophobic material located in the cavity and at least partially covering the surface structures.

12. The smartcard according to claim 11, wherein the surface structures have a largest cross section size in the plane of the smart card surface in the range of 5-100 µm.

13. The smartcard according to claim 11, wherein the surface structures have a height in the range of 5-50 µm.

14. The smartcard according to claim 11, wherein the hydrophobic material is a fluorinated carbon polymer.

15. The smartcard according to claim 11, wherein the cavity has a depth in the range of 10-50 µm.

* * * * *